United States Patent
Ables et al.

(10) Patent No.: US 6,849,332 B1
(45) Date of Patent: Feb. 1, 2005

(54) STRING BINDERS AND METHOD FOR MAKING SAME

(75) Inventors: Brian William Ables, Reynoldsburg, OH (US); William G. Hager, Westerville, OH (US); Timothy W. Ramey, Chillicothe, OH (US); Jay J. Beckman, Newark, OH (US); Diane M. Hulett, Glenford, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 564 days.

(21) Appl. No.: 09/593,550

(22) Filed: Jun. 14, 2000

Related U.S. Application Data

(63) Continuation-in-part of application No. 09/280,808, filed on Mar. 30, 1999, now Pat. No. 6,579,619.

(51) Int. Cl.[7] .............................................. B32B 3/00
(52) U.S. Cl. ...................... 428/378; 428/375; 428/392
(58) Field of Search ................................ 428/375, 378, 428/392

(56) References Cited

U.S. PATENT DOCUMENTS

| | | | |
|---|---|---|---|
| 3,170,197 A | 2/1965 | Brenner | |
| 3,450,747 A | 6/1969 | Smith et al. | |
| 4,117,067 A | 9/1978 | Charter et al. | |
| 4,309,202 A | 1/1982 | Parbhoo | |
| 4,427,482 A | 1/1984 | Yamada et al. | |
| 4,898,770 A | 2/1990 | Dunbar | |
| 5,024,890 A | 6/1991 | Pollet et al. | |
| 5,206,085 A | * 4/1993 | Nakagawa et al. | 428/372 |
| 5,217,672 A | 6/1993 | Kelman et al. | |
| 5,227,236 A | * 7/1993 | Handermann | 428/361 |
| 5,312,687 A | 5/1994 | Pollet et al. | |
| 5,454,846 A | 10/1995 | Roncato et al. | |
| 5,756,206 A | * 5/1998 | Davies et al. | 428/367 |
| 5,766,541 A | 6/1998 | Knutsson et al. | |
| 5,843,365 A | 12/1998 | Pinson et al. | |
| 5,972,503 A | * 10/1999 | Woodside | 428/378 |
| 6,162,536 A | * 12/2000 | Montsinger | 428/372 |
| 6,183,864 B1 | * 2/2001 | Mizukami et al. | 428/392 |
| 2002/0090408 A1 | * 7/2002 | Dahl et al. | 425/80.1 |
| 2002/0098754 A1 | * 7/2002 | Flautt et al. | 442/59 |

FOREIGN PATENT DOCUMENTS

| | | |
|---|---|---|
| WO | WO 00/58233 | 10/2000 |
| WO | WO 01/96077 A1 | * 12/2001 |
| WO | WO 01/96105 A2 | * 12/2001 |
| WO | WO 02/42363 A2 | * 5/2002 |

OTHER PUBLICATIONS

"Split–hinged Directed Fiber Preform Screen" Research Disclosure, Kenneth Mason Publications, Hampshire, GB, No 370. Feb. 1, 1995.

* cited by examiner

Primary Examiner—B. Hamilton Hess
Assistant Examiner—J. M. Gray
(74) Attorney, Agent, or Firm—Inger H. Eckert; Maria C. Gasaway

(57) ABSTRACT

A string binder is disclosed which is useful for making reinforcing articles for use in the manufacture of molded composite articles. The string binder comprises a fibrous carrier substrate covered with a solidified coating comprising a binder resin material having an acid value of less than about 30 mg KOH/g of resin. Additionally, the fibrous carrier substrate may be coated with at least one layer of a pre-coating or post-coating comprising a catalyst composition. The string binder may be co-roved with one or more ends of a separate fibrous reinforcing material to make a product suitable for use in various molding applications.

4 Claims, 5 Drawing Sheets

STRING BINDERS AND METHOD FOR MAKING SAME

CROSS REFERENCE TO RELATED APPLICATIONS

This application is filed as a continuation-in-part of U.S. patent application Ser. No. 09/280,808, filed Mar. 30, 1999, now U.S. Pat. No. 6,579,619 the content of which is relied upon and incorporated herein by reference.

TECHNICAL FIELD AND INDUSTRIAL APPLICABILITY OF THE INVENTION

The invention relates to a method for making string binders for use in reinforced composite molding applications, and to string binders made by the present invention. When the invention is subject to a wide range of applications, the string binders of the present invention are especially suited for use in reinforced composite applications, and will be particularly described in that connection. For example, the string binder formed according to the method of the present invention may be combined with one or more reinforcing fiber materials to form a multi-end roving product, which may be used in either chopped or continuous form as reinforcing materials having improved impact strength. Such reinforcing materials are useful in numerous reinforced composite applications, including the molding of preforms typically used in, liquid resin molding of fiber-reinforced articles.

BACKGROUND OF THE INVENTION

Reinforcing fiber materials comprising glass, polymer, other reinforcing fibers, or blends thereof are commonly used as reinforcement materials in molded composites. These reinforcing fiber materials, when incorporated into the matrix resin of such molded composites, provide the finished product with a higher level of tensile strength and durability than could possibly be achieved if either the reinforcing fibers or the matrix resins were used separately. Reinforcing fibers may be incorporated into a composite matrix resin either in continuous form, as is done in the manufacture of filament-wound composites, or, alternatively, the reinforcing fibers may be introduced into the composite matrix resin as chopped segments that may be dispersed throughout the composite matrix in linear or random fashion, depending on the characteristics that are desired in the final molded composite product.

Generally, in the manufacture of reinforcement materials such as preforms that are used in liquid resin molding processes, chopped segments of a reinforcing fiber material, which is also referred to herein as a "fibrous carrier substrate", may be combined with a binder resin, after which the resulting composition is laid down over a porous form and solidified. The resulting solidified, malted structure is known as a preform. The fibrous carrier substrate is typically of glass, and may, for example, be a glass strand. The preform made from the combination of the binder resin and the glass carrier substrate can then be cured and/or subjected to a liquid resin molding processes to form the molded composite end product.

Several means of combining the binder resin with the glass carrier substrate to make preforms are known in the art. These means include using emulsified binder resin compositions, dry binder resin compositions or molten binder resin compositions in combination with the glass carrier substrate. For example, an emulsion binder composition comprising a heat-curable binder resin in a diluent or solvent may be blended with the glass carrier substrate; or the binder resin and the glass carrier substrate may be combined in a diluent to form a slurry. Either the emulsion or the slurry may then be poured onto a porous form or mold and suction or a vacuum applied to remove the diluent or solvent component, thereby solidifying the preform. The obvious drawbacks associated with using an emulsion binder include the requirement for extensive clean-up of the forming screens; environmental hazards relating to the discharge of solvent or diluent vapors containing volatile organic chemicals (VOCs); risks to the safety of personnel from exposure to such chemicals; and added costs arising from a lengthy drying period or the need for additional equipment to prepare the preform.

Dry binder resin compositions comprising, for example, a powdered binder resin, are also known for use in making preforms. The powdered binder resin is heated sufficiently to melt and cure the binder resin after it is combined with the carrier material. One disadvantage of using the powdered binder resin is that it may be difficult to control the amount of binder powder required to create an acceptable preform. Excess powdered binder resin, when melted, results in the presence of excess molten resin, which may foul equipment and require extensive cleanup operations.

Alternatively, a molten binder resin that is obtained from a source other than a powdered binder resin may be combined with the fibrous carrier substrate to make a preform. To make such a preform using molten binder, typically strands of glass carrier substrate are chopped into segments, which are combined with the binder resin and placed over a porous structural form such as a mesh screen. Alternatively, the strands of glass carrier substrate material are chopped into segments and sprayed over the porous structural form, after which a binder resin is added. The method of adding the binder resin may be via a flame-spray process, in which solid, powdered binder resin is sprayed through a flame immediately before it contacts the glass carrier substrate. In this fashion, the binder resin is melted before it mixes with the glass carrier substrate. A process involving the steps of heating, curing and cooling of the material is then applied to form, shape and consolidate the mixture, as well as to remove any solvents or diluents that may be present. In this manner, the product is solidified into a preform ready for molding or further processing. The solidified preform may then be removed and used in a subsequent molding operation, such as injection molding, in which a molding resin is injected around the preform and the combination is then cured to form a structurally molded composite.

Because this technique of making the preform typically requires applying an excess of binder resin that eventually melts during the manufacturing process, a commonly observed drawback is the build-up of excess molten binder resin on the equipment, the removal of which is both costly and time-consuming. Moreover, the process includes the inherent difficulties of dealing with the molten binder resin. For example, the process of adding the binder resin is difficult to control, and the handling of the hot, molten binder resin poses an additional safety concern.

Continuous glass fiber strands that have been pre-impregnated with a binder resin may also be chopped into fiber strand segments for preform manufacture. The pre-impregnated strands, known as string binders, may be formed by applying one or more layers of a binder resin onto the surface of a continuous glass fiber strand after it is formed, then allowing the binder resin to solidify on the surface of the strand. After the coating of binder resin is solidified, the coated strand is then chopped into string binder segments that may be used in a spray-up process to make preforms.

The binder resins used in preform manufacture are usually either thermoplastic polymers in molten or powdered form, or low acid value thermosetting emulsion polymers such as crystalline polyesters. The term "crystalline" relates to the inherent ability of the thermosetting resin to form crystallites or regions of molecular order dispersed among regions of molecular disorder within the solidified polymer. The ability of a polymer to display crystalline properties is determined principally by its composition. For example, thermoplastic polyesters are macromolecules that contain no chemical groups to effect inter-linking when heated. The absence of such inter-linking defines these polymers as thermoplastic in nature. Such thermoplastic polymers are typically heated to the softening point, forced into the shape of the desired article, then cooled below the softening point to yield the finished reinforcing article. However, like thermosetting polyesters, the thermoplastic polyesters may display many levels of crystallinity, again depending on composition.

Crystalline thermosetting polyesters find use, for example, in organic fiber manufacture. Perhaps the best known crystalline polyester is polyethylene terephthalate, PET, which is commonly known as DACRON polyester, available from DuPont Inc.

The term "high acid value", as used herein with respect to the binder resin, is intended to represent the acidity of the binder resin, as measured in terms of the amount of potassium hydroxide (KOH) required to neutralize the acidic functional groups in one gram of the binder resin. A high acid binder resin is one that contains acidic functional groups such that the measured acid value of the binder resin is greater than 30 mg KOH/g of binder resin. The known drawbacks of using such high acid binder resins include a high level of incompatibility between the binder resin molecules and the composite matrix resin because of the large degree of difference in polarity between the binder resin molecules and the matrix resin molecules, and/or the absence or unavailability of reactive functional groups that can crosslink with the composite matrix resin. This incompatibility can result in a lesser degree of wet-out of the fibrous carrier substrate in the composite matrix resin. The poor wet-out of the fibrous carrier substrate in turn leads to associated product defects such as blistering during the composite molding phase, and bleeding or blistering during post-bake of the molded composite product.

Bleeding in the molded composite product is related to certain characteristics of the binder resin that affect its compatibility with the matrix composite resin. While thermoplastic and thermosetting resins have both been used as a binder resin in string binder formulations, the different characteristics of these types of polymers affect their use in composite formulations. Where the binder resin is a thermosetting polymer, a resin with a lower molecular weight may generally be used because the molecules will link during cure to form a permanently solidified, continuous, cured matrix with essentially infinite molecular weight. The lower molecular weight resin will easily flow and therefore will more fully coat the fibers of the fibrous substrate. Typically, such thermosetting binder resin polymers are thermosetting crystalline polyester resins made up of small molecules, which melt and flow easily. In contrast, molecules of thermoplastic binder resin do not link to form a permanently solidified matrix. Rather, the solidified matrix may be induced to re-melt and flow by applying heat. In order to achieve acceptable performance using a thermoplastic binder resin, it is typically necessary to begin with thermoplastic resins that have a higher molecular weight. Such thermoplastic resins are usually composed of long chains of atoms, which become easily entangled, thereby causing a restriction of flow. This reduced flow, which results in a higher melt viscosity, is a disadvantage in that it impedes flow of the coating over the fibers. Further, the large, unlinked thermoplastic resin molecules demonstrate a tendency to diffuse through the composite matrix during post-baking. This diffusion or bleeding typically causes blemishes in the surface of the composite.

Blistering may result from an undesirable chemical reaction between a component of the composite matrix resin and the binder resin during the composite curing process. For example, where the composite matrix resin is a polyurethane, an isocyanate group of the polyurethane may react with acid or water in the binder to form carbon dioxide and an amine as reaction by-products. The evolution of the carbon dioxide gas can lead to the formation of blisters on the surface of the cured composite. Blistering may ultimately result in decreased glass/matrix resin bond strength in the preform-reinforced composite, and, as a result, the physical strength of the finished, molded composite article may be diminished. Blistering is also aesthetically undesirable because the appearance of the molded composite product is compromised.

There is, therefore, a need for a manufacturing process, for example for making preforms to be used in composite molding, in which a fibrous carrier substrate may efficiently be combined with a binder resin before molding the preform, such that the separate application of a binder resin in the form of a powder melt, emulsion or slurry is not required. Further, there exists a need for a moldable structure comprising a fibrous carrier substrate and a binder resin, which enhances wet-out and prevents undesirable effects such as blistering or bleeding when the combination comprising the fibrous carrier substrate and binder resin are used in a composite molding process. There also exists a need for a combination of ingredients for making a preform that does not rely on the use of environmentally hazardous organic solvents, or other solvents that require a drying procedure that lengthens the manufacturing ,process. These needs are met by the invention described herein.

SUMMARY OF THE INVENTION

Accordingly, the present invention is directed to a method for making a string binder, and string binders made by that method, which substantially obviates one or more of the problems due to limitations and disadvantages of the related art. The string binders of the invention are moldable structures comprised of a composition including a binder resin material, and, optionally, a fibrous carrier substrate.

The objectives and advantages of the invention will be realized and attained by the methods and products particularly pointed out in the written description and claims, as well as the drawings. Additional features and advantages of the invention may be learned by practice of the invention.

The invention includes a method for making a string binder, comprising the steps of:
  a) forming at least one strand of a fibrous carrier substrate;
  b) preparing a catalyst composition comprising a catalytically effective amount of a catalyst having a high activation temperature;
  c) applying at least one layer of a pre-coating comprising the catalyst composition to the surfaces of the fibrous carrier substrate;

d) applying at least one layer of a solvent-free binder resin composition comprising a thermoformable liquid binder resin material having an acid value of less than about 30 mg KOH/g of resin to the surfaces of the fibrous carrier substrate to form a coated fibrous carrier substrate; and e) solidifying the coated fibrous carrier substrate to form a string binder.

In another aspect, the invention includes a method for making a string binder comprising:

a) forming at least one strand of a fibrous carrier substrate;

b) applying at least one layer of a solvent-free binder resin composition comprising a thermoformable liquid binder resin material having an acid value of less than about 30 mg KOH/g of resin to the surfaces of the fibrous carrier substrate to form a coated fibrous carrier substrate;

c) preparing a catalyst composition comprising a catalytically effective amount of a catalyst having a high activation temperature;

d) applying at least one layer of a post-coating comprising the catalyst composition to the surfaces of the fibrous carrier substrate; and e) solidifying the coated fibrous carrier substrate to form a string binder.

Another embodiment of the invention relates to a method for making a string binder comprising the steps of:

a) preparing a solvent-free binder resin composition comprising a thermoformable binder resin material having an acid value of less than about 30 mg KOH/g of resin and a catalyst;

b) forming the solvent-free binder resin composition into strands; and c) solidifying the strands to form strands of string binder.

The invention also relates to a string binder comprising polymerized filaments of a thermoformable binder resin material having a low acid value, preferably of less than about 30 mg KOH/g of resin. The string binder may further comprise a fibrous carrier substrate coated with a solvent-free binder resin composition comprising a thermoformable binder resin material, said solvent-free binder resin composition imparting thermoformability to the fibrous carrier substrate that is used in reinforcing articles made using the string binder.

In yet another embodiment, the invention relates to a method of making a reinforcing article for use in a composite molding process comprising:

a) preparing a string binder comprising a thermoformable liquid binder resin material having an acid value of less than about 30 mg KOH/g of resin and an effective amount of a catalyst having a high activation temperature;

b) forming the string binder into a reinforcing article for use in a composite molding process; and c) molding the reinforcing article to form a molded composite article.

The invention further relates to a composition for forming a reinforcing article comprising a thermoformable binder resin material having a low acid value.

The present invention also relates to a multi-end roving comprising one or more strands of a reinforcing fiber material and one or more strands of a string binder prepared as described herein.

The inventive concept also includes a process of manufacturing a preform comprising the steps of:

a) forming a string binder according to a method comprising the steps of:

i) forming at least one strand of a fibrous carrier substrate;

ii) preparing a catalyst composition comprising a catalytically effective amount of a catalyst having a high activation temperature;

iii) applying at least one layer of the catalyst composition to the surfaces of the fibrous carrier substrate;

iv) applying at least one layer of a solvent-free binder resin composition comprising a thermoformable liquid binder resin material having an acid value of less than about 30 mg KOH/g of resin to the surfaces of the fibrous carrier substrate to form a coated fibrous carrier substrate; and v) solidifying the coated fibrous carrier substrate to form a string binder.

b) chopping the string binder into segments;

c) depositing the segments onto the surface of a shaped, porous form;

d) applying heat to partially melt and fuse the segments into a preform structure; and e) curing the preform.

In another aspect, the invention includes a preform manufactured using chopped segments of a thermosettable string binder as is herein described, or chopped segments of a multi-end roving comprising one or more strands of the string binder in combination with one or more strands of a fibrous reinforcing material.

In yet another embodiment, the invention provides a reinforced, molded article formed by molding a moldable material comprising a matrix polymer such as a thermoplastic or thermoset polymer, in contact with a preform comprising the string binder, which is herein described.

As used herein, the term "thermoformable", as it is used with respect to the binder resin materials of the present invention, is intended to include a binder resin material that can be formed by heating, such as a thermoplastic resin, or a resin that is irreversibly set using heat, such as a thermosetting resin. The "binder resin material" of the present invention comprises a binder resin that fuses the components of the string binder together. For example, where the string binder includes a fibrous carrier substrate, the binder resin material acts by fusing together the fibers or strands of the fibrous carrier substrate such that the mixture containing the fibrous carrier substrate and the binder resin material may be solidified. The binder resin material also facilitates curing of the string binder to form a reinforcing article such as a preform, which may be used in a further manufacturing process to make a composite article. The binder resin material may comprise a thermoplastic or thermosetting polymer that is specially modified to have a low acid value, preferably in the range of less than about 30 mg KOH/g binder resin, and most preferably less than 10 mg KOH/g binder resin. The term "fibrous carrier substrate" is defined to include a fibrous substrate selected from reinforcing fiber materials that are commonly known in the art. As used herein, the term "reinforcing fiber material" includes any fibrous material generally known in the art for providing reinforcement, which may be used in addition to the fibrous carrier substrate.

It is to be understood that both the foregoing general description and the following detailed description are exemplary and explanatory, and are intended to provide further illumination of the invention as claimed.

The accompanying drawings are included to provide a further understanding of the invention and are incorporated

DETAILED DESCRIPTION OF THE PREFERRED EMBODIMENTS OF THE INVENTION

Figure 1:
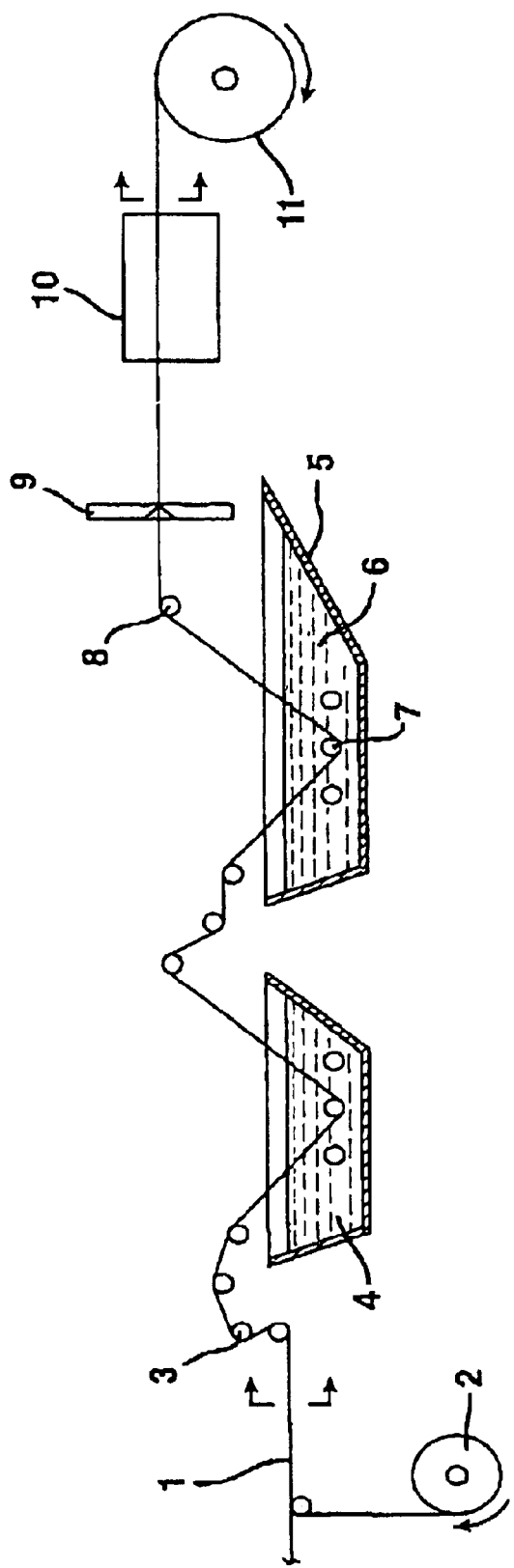
FIG. 1 is a schematic diagram of a first embodiment of the method of the present invention for making a string binder.

The present invention provides a process for making a string binder that may be used in continuous or chopped form as a raw material in the preparation of preforms for molding processes, and which imparts good physical characteristics to the final molded article when a preform comprising the string binder is molded in a conventional resin molding process.

The string binders of the present invention may integrally comprise a fibrous carrier substrate. Any suitable fibrous carrier substrate may be used. Preferably, the fibrous carrier substrate may be selected from fibrous materials that are commonly known in the art, such as glass, carbon, natural fibers, polymers and other fiberizable materials known in the art, or mixtures thereof. Examples of fibrous carrier substrates that can be used either alone or in combination with glass or carbon fibers include thermoplastics including polyesters such as DACRON®, polyaramids such as KEVLAR® and natural fibers. The fibrous carrier substrate is preferably a fibrous material in the form of continuous strands composed of multiple filaments. The strands may take the form of yarns, or rovings, including two-end and four-end rovings. Preferably, the strands of fibrous carrier substrate comprise reinforcing fibers. Typically, such strands are formed by combining filaments of the reinforcing fibers as they are attenuated from a fiber-forming apparatus such as a bushing or orifice plate, although they may also be made by any method conventionally known in the art. The filaments may be coated with a suitable sizing composition. For example, a suitable sizing composition may comprise functional agents such as lubricants, coupling agents and film-forming polymers. After being coated with the sizing composition, the filaments may be gathered into strands. These strands may then be formed into yarns or rovings.

Preferably, the diameter of the filaments making up the strands ranges from about 3.5 to about 24 μm, preferably from about 9 to about 13 μm. The preferred filament diameters correspond to U.S. filament designations H, G, and K. In the method according to the invention, preferably the strand input has a yield of from about 3,700 to about 7,500 yd/lb., most preferably about 7,500 yd/lb., or approximately 66 TEX (g/km measurement reflecting the weight and thickness of the strand).

Any suitable binder resin material having a low acid value may be used in the practice of the invention. As used herein, the term "low acid value" is intended to include a binder resin material that has been modified to have low acidity, as measured by an acid value of less than about 30 mg KOH/g resin. Preferably, the binder resin material is a crystalline resin. Preferably, the acid value of the binder resin material is less than about 10 mg KOH/g resin. It has surprisingly been discovered that a lower acid value is effective to increase compatibility with particular composite matrix polymers, whereas the common practice in the art has been to maximize the acid value to make the binder resin emulsifiable in water. In this respect, the binder resins of the present invention differ from the resin materials previously known in the art, in that typical art-recognized acid values for binder resins are on the order of greater than 30 mg KOH/g resin.

The low acid value that is favored for the binder resin material used to make the string binders of the present invention is achieved by modifying the end groups of the binder resin molecules to be more compatible with the moldable matrix polymer that is molded with the string binder to form the composite. As a result of this improved compatibility, the binder resin material is able to achieve better integration with the moldable matrix polymer, and the resulting molded composite products show reduced blistering upon cure.

The melt viscosity of the binder resin material also plays an important role in the performance of the string binder product. For example, where the string binder is comprised of the binder resin material and a fibrous carrier material, it the viscosity of the binder resin material is too low, then upon melting of the binder resin material the molten binder resin tends to wick into the bundles of fibrous carrier material. As a result, insufficient binder resin material is available to cause bonding between the strands of fibrous carrier material, and, consequently, a very soft, weak preform is obtained.

The preferred binder resin compositions that may be used in the practice of this invention include one or more acid-modified thermoplastic or thermosetting resins, such as a low-acid crystalline polyester resin. Preferably, the low-acid crystalline polyester resins are modified resins that are manufactured by controlling the proportions of ingredients and processing conditions during polymerization. The resulting low-acid crystalline polyester resin comprises particular desirable molar proportions of the monomers that are condensed to form the resin. The modified crystalline polyester resin is then transferred to either a fiber drum or release paper and cooled to room temperature, after which the crystalline mass may be broken into small pieces and ground into a coarse powder. Exemplary combinations of crystalline polyester resins that may be formed by polymerization of different monomers include:

| Monomers | Molar Ratios |
|---|---|
| ethylene glycol/fumaric acid | 1.0/1.0 |
| 1,6-hexanediol/fumaric acid | 1.02/1.0 |
| 1,6-hexanediol/ethylene glycol/fumaric acid | 0.82/0.2/1.0 |
| 1,6-hexanediol/ethylene glycol/fumaric acid | 0.92/0.1/1.0 |
| 1,6-hexanediol/1,4-butanediol/fumaric acid | 0.82/0.2/1.0 |
| 1,6-hexanediol/1,4-butanediol/fumaric acid | 0.92/0.1/1.0 |
| 1,6-hexanediol/1,4-cyclohexanedimethanol/fumaric acid | 0.92/0.1/1.0 |
| 1,6-hexanediol/1,4-cyclohexanedimethanol/fumaric acid | 0.82/0.2/1.0 |

-continued

| Monomers | Molar Ratios |
| --- | --- |
| 1,4-butanediol/fumaric acid | 1.03/1.0 |
| 1,4-butanediol/ethylene glycol/fumaric acid | 0.82/0.2/1.0 |
| 1,4-butanediol/ethylene glycol/fumaric acid | 0.70/0.3/1.0 |
| 1,4-butanediol/ethylene glycol/fumaric acid | 0.92/0.1/1.0 |
| 1,4-butanediol/1,8-hexanediol/fumaric acid | 0.82/0.2/1.0 |
| 1,4-butanediol/1,6-hexanediol/fumaric acid | 0.92/0.1/1.0 |
| 1,4-cyclohexanedimethanol/ethylene glycol/fumaric acid | 0.93/0.1/1.0 |
| 1,4-cyclohexanedimethanol/ethylene glycol/fumaric acid | 0.83/0.2/1.0 |
| 1,4-cyclohexanedimethanol/1,6-hexanediol/fumaric acid | 0.83/0.2/1.0 |
| 1,4-cyclohexanedimethanol/1,6-hexanediol/fumaric acid | 0.90/0.1/1.0 |
| 1,4-cyclohexanedimethanol/1,4-butanediol/fumaric acid | 0.83/0.2/1.0 |
| 1,4-cyclohexanedimethanol/1,4-butanediol/fumaric acid | 0.90/0.1/1.0 |

The combination of monomers as described can also be used to affect the melting point of the resulting polymer. For example, the melting points of crystalline polyester resins formed using the combinations described above can have melting points ranging from less than 100° C. to over 160° C.

In one preferred embodiment, the binder resin is used in conjunction with a catalyst having a high activation temperature this activation temperature being higher than the melting point of the crystalline binder resin. The role of the catalyst is to effect cure of the binder resin during the manufacture of the reinforcing article. When activated, the catalyst promotes the formation of a cross-linked product.

Accordingly, the catalyst must be a compound or mixture of compounds that is compatible with the binder resin and which has a temperature of activation that is higher than the processing temperature used to melt the string binder as it is being formed into the reinforcing article. For example, where the reinforcing article is a preform, the catalyst should have an activation temperature that is higher than the temperature required to melt the binder resin as the string binder is formed into the preform. In this manner, the binder resin polymer may, for example, be used to coat the fibrous carrier substrate, or it may be formed alone as a string binder, without initiating the curing process. Rather, the activation temperature of the catalyst is such that catalytic activity is initiated during the step of curing of the preform. Preferably, the catalyst is activated at the higher temperatures used in preform manufacture. In such applications, the activation temperature of the catalyst is typically in the range of from about 350° F. to about 400° F.

The catalyst may be combined with the binder resin composition before it is applied to the fibrous carrier material, or alternatively, it may be applied as at least one separate layer of a catalyst composition either as a pre-coating before application of the binder resin composition, or as a post-coating after the binder resin composition is applied. In such embodiments, the catalyst composition may include the catalyst and a diluent, such as water, optionally in combination with other ingredients, such as a carrier material that is compatible with and promotes a uniform solution or dispersion of the catalyst. Thus, in one embodiment of the invention, the catalyst composition may comprise a slurry of catalyst in water. In an alternate embodiment, the catalyst composition may include the catalyst and a molten carrier material. Where a carrier material is included in the catalyst composition, the carrier material may typically comprise either a thermoplastic or a thermosetting polymer, both of which are commonly known as film formers used in glass fiber fabrication. Preferably, the carrier material comprises a polyurethane, which is desirable because of its good adhesion to glass substrates and its ease of use in glass fiber fabrication processes. The catalyst composition may also comprise any additives conventionally known to improve the adhesion of coating materials to the surfaces of the fibrous carrier substrate. Preferably, the catalyst composition comprises a catalytically effective amount of a suitable catalyst and a thermoplastic carrier, which may, for example, be a polyurethane.

The catalyst composition comprising a carrier material may be prepared, for example, by combining a catalytically effective amount of a suitable catalyst with a molten polyurethane polymer, and the resulting composition applied to a fibrous carrier substrate.

Any suitable catalyst may be used. Exemplary families of catalysts that may be used with the invention include: diacyl peroxides, for example benzoyl peroxide; peroxyesters, for example t-butyl-peroxy-2-ethylhexanoate; dialkyl peroxides such as dicumyl peroxide; hydroperoxides such as cumene hydroperoxide; perketals such as 1,1-di-(t-butyl-peroxy) cyclohexane; and peroxydicarbonates such as di(2-ethylhexyl)peroxydicarbonate. Preferred catalysts include t-butyl perbenzoate and dicumyl peroxide.

The catalyst composition is suitably prepared as either a dilute solution or emulsion in a diluent. Suitable diluents that form a solution or emulsion with the catalyst include water, acetone, methylene chloride, methyl cellosolve, toluene, benzene and the like. Preferably, the catalyst composition is prepared as an emulsion in water because, in such a preparation, the evolution of volatile organic compounds during processing is prevented. When a solvent is used, the proportion of catalyst to solvent may range from about 1 to about 20 parts by weight of catalyst to from about 80 to about 99 parts by weight solvent. (It should be noted that the designation "parts by weight", as it is used throughout this application is intended to designate proportions based on the dry weight of each ingredient). Preferably, about 2–4 parts by weight catalyst may be dissolved in from 96–98 parts by weight solvent. Most preferably, about 3 parts by weight catalyst may be dissolved in about 97 parts by weight solvent.

Alternatively, the catalyst may be emulsified in water, preferably with the use of a suitable surfactant to form a concentrated emulsion which maybe stored and diluted as required. In a preferred embodiment of the invention, about 46 parts by weight of molten catalyst are combined with about 6 parts by weight of Pluronic F-77, which is a polyoxyalkylene surfactant commercially available from BASF Corp. The hot mixture is then slowly added to water under very high shear, and the resulting concentrated emulsion is neutralized with ammonia to a final pH of about 9.3. The concentrated emulsion may be stably stored and diluted just before use in the desired proportions for application to the fibrous carrier substrate.

The catalyst composition may be applied as a separate coat under, above, or interspersed between coats of the binder resin composition. In one such embodiment of the invention, at least one layer of a solvent-free binder resin composition comprising a thermoformable binder resin material having an acid value of less than about 30 mg KOH/g of resin, and at least one layer of a catalyst composition are applied to a fibrous carrier substrate. For example, the at least one layer of catalyst composition may be applied to the fibrous carrier substrate as a pre-coating before the at least one layer of binder resin composition is applied. As an additional modification, the pre-coating may further comprise a carrier material in combination with the catalyst composition. The pre-coating may be applied in any convenient manner using conventional coating techniques. Such techniques include, for example, spraying, roller or pad coating, wire coating or immersion. Preferably, the pre-coating is applied to the fibrous carrier substrate using a roll applicator, such as a graphite roll, or by immersing the fibrous carrier substrate in a bath containing the catalyst coating solution or dispersion. This particular embodiment is represented in FIG. 1.

Referring to FIG. 1, a strand input 1 of a fibrous carrier substrate, which is preferably an E-glass strand, is fed from a feed spool 2 through an optional tensioner bar arrangement 3. The strand input 1 may be passed through a first bath 4 containing a solution or dispersion of a suitable catalyst composition to form a pre-coating of the catalyst composition. Optionally, the strand input 1 comprising the pre-coating of catalyst composition may be passed through an air chamber, such as an oven, to dry or solidify the pre-coating before the binder resin composition is applied. Where an oven is used, the temperature is maintained such that the temperature of the strand input 1 is maintained below the activation temperature of the catalyst. After the pre-coating is applied, the strand input 1 is passed through a binder-resin coating bath 5. Preferably, if the catalyst composition is a solution, the majority of the solvent in the catalyst composition may be evaporated from the surface of the strand by any conventional means before it is coated with the binder resin. The catalyst-coated strand is then passed into an immersion coating bath 5 containing the binder resin composition 6. The coating bath may bath any conventional immersion coating apparatus suitable for immersing continuous fiber substrates of indefinite length. Preferably, the, bath is heated so that the binder resin composition to be coated onto the glass fiber is in a molten or liquid state to adequately wet the fiber. The temperature of the bath is selected based on the softening or melting properties of the binder resin material, in that the temperature should be high enough to melt the resin and keep it in a molten state, while at the same time being low enough to avoid initiating a premature cure. The binder resin coating bath 5 is preferably equipped with conventional breaker bars 7 to guide the strand input 1 while it is submerged in the bath.

Additionally, where the binder resin composition is applied at elevated temperature, the coated strand input may be cooled by any means conventionally known in the art, including, but not limited to, using forced air or exposure to latent ambient air. For example, the strand input 1, having the desired amount of binder resin composition applied to the surfaces thereof, may be passed through an air chamber 10, where the binder resin composition solidifies. As used herein with respect to the application of the binder resin composition or the catalyst composition onto the surfaces of the fibrous carrier substrate, the term "solidify" is intended to include setting, drying, hardening, crystallizing, partially curing, or any combination thereof. The air chamber is any suitable enclosure for allowing the binder resin in the binder resin composition to solidify to a solid state. Preferably, unheated forced air is applied in order to speed the solidification process without causing premature curing of the resin.

The amount of binder resin composition applied in the binder resin coating bath 5 can be determined by measuring the loss on ignition (LOI) of the coated strand input 1. Preferably, the LOI should be high enough to ensure that the desired properties of the binder resin coating, such as increased wet-out of the strand input when it is molded, are maximized, while undesirable properties such as growth of the forming package and increased fuzz in the coated strand input product are minimized.

After exiting the bath 5, the strand input 1 may be passed over at least one additional breaker 8 before being fed through a stripper die 9 to remove substantially all but the desired amount of resin from the strand input 1. The stripper die 9 is selected to have an orifice opening of the appropriate diameter to meter the desired amount of resin onto the fibrous glass structure. For example, the stripper die orifice may be of a diameter ranging from about 0.010–0.025 inches across, for example about 0.020 in. Preferably, the orifice of the stripper die 9 is gauged to produce a coated strand with a binder carrier ratio of from about 20% to about 60% of binder resin in relation to the weight of the entire strand.

The coating process as shown in FIG. 1 should not be considered as limiting the manner in which either the catalyst or binder resin composition may be applied according to the invention. Rather, the process may, for example, also involve applying a post-coating comprising the catalyst composition over the at least one layer of binder resin composition. Additionally, as a further modification of the invention, the post-coating may comprise a carrier material. Alternatively, a post-coating comprising a film-forming polymer but excluding the catalyst composition may also be applied. In this latter modification, the at feast one layer of post-coating is preferably applied over at least one previously deposited layer comprising the catalyst composition.

It is also possible to apply the catalyst and resin to a strand in a single coating step, if the catalyst and resin are selected such that they can be mixed without prematurely initiating cure of the resin during preform manufacture. Accordingly, in another embodiment, the crystalline polyester binder resin and the catalyst may be combined and the composition applied to the fibrous substrate at a temperature below the activation temperature of the catalyst. Such a one-step process advantageously allows certain equipment and processing steps to be eliminated, and provides for a more cost-efficient manufacture of the string binder. For example, the binder resin composition may be combined in a static mixer and delivered to a one-step injection die system, wherein the catalyst is added to the binder resin composition immediately before it is coated onto the surface of the fibrous carrier substrate. When a one-step injection dye is used, a solution or emulsion of the catalyst may not be necessary, and thus this source of waste diluent may be eliminated from the system.

In one example of preparing a binder resin composition for use in a one-step injection dye, a molten binder resin is first prepared by heating powdered binder resin in a hot-melt processor. The catalyst, in dry form, is then added to the processor for combination with the molten binder resin. Optionally, a catalyst composition comprising the catalyst and a solvent could also be used. The selection of the appropriate catalyst and resin system will depend on compatibility of the catalyst and resin, as well as the relative resin melting point and catalyst activation temperature. The processor is linked, by a direct input feed, to a static mixer, thereby allowing the flow of the resin composition containing the catalyst through an outlet disposed in the processor, and through the inlet port of an impregnation or coating-type die. A pump or other conventional flow regulation device controls the feed from the outlet port of the static mixer to the inlet port of the die. The die also comprises an aperture for input of a carrier fiber strand. The direction of movement of the strand input through the die is preferably aligned transverse to the flow of binder resin composition from the static mixer. The strand is then coated by the binder resin composition comprising the catalyst at a temperature below the activation temperature of the catalyst.

Figure 2:
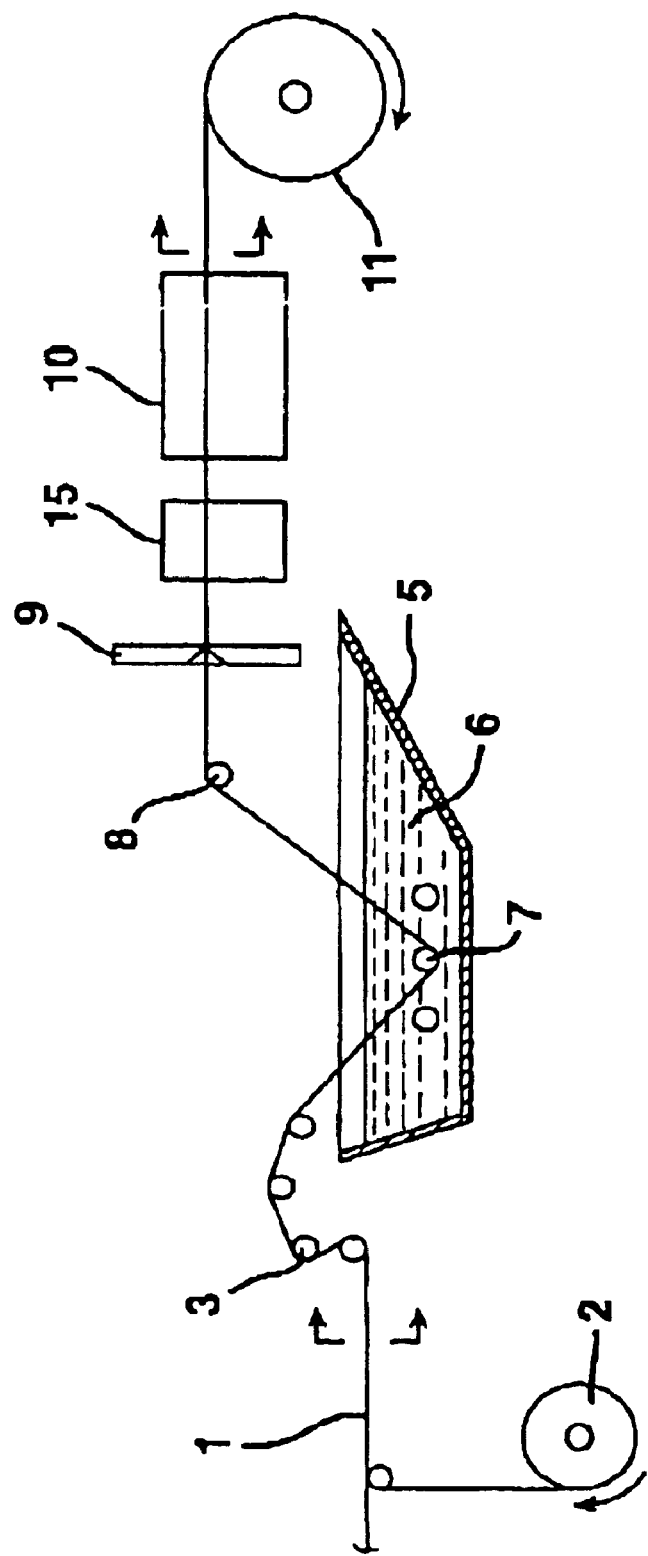
FIG. 2 is a schematic diagram of a second embodiment of the present invention for making a string binder.

Alternatively, the mixture of the binder resin composition including the catalyst may be applied to the strand input of fibrous carrier material using other means, such as a dip-draw immersion bath process, as is shown in FIG. 2.

As seen in FIG. 2, a strand input 1 of fibrous carrier substrate is unwound from a feed spool 2 and through a tensioner bar arrangement 3, after which it is passed through a binder resin coating bath 5 containing the binder resin composition 6. The binder resin coating bath 5 may be equipped with breaker bars 7. The strand input 1 is then passed over one or more additional breaker bars 8, and then through a stripper die 9 to remove any excess binder resin composition. The strand input 1 is then exposed to an applicator means 15, such as, for example, a graphite roll applicator, whereby at least one layer of a catalyst composition is applied as a post-coating. Other means for applying the post-coating include dip tanks, rollers, extrusion dies and other applicator means known in the art. The strand input 1 coated with the binder resin composition and over-coated with the post-coating of catalyst composition may then be passed through any means suitable for removing excess catalyst composition, such as a stripper die (not shown in the drawings), after which it is allowed to solidify in an air chamber 10.

The dried, coated fibrous carrier substrate which comprises the string binder of the present invention may be collected, packaged and stored according to any methods conventionally known in the art. Referring again to FIG. 1, the dried coated strand input 1, which constitutes an embodiment of the string binder of this invention, exits the cooling chamber and is optionally passed over a series of one or more breaker bars (not shown) and then wound onto a product spool or collet 11 using any conventional winding apparatus for storage. The rate at which the strand input 1 is wound depends on the drying conditions, the composition of the resin, the amount of resin remaining on the strand once the excess has been removed, and other factors affecting the drying rate that are known to those skilled in the art. In short, the winding rate is preferably the maximum rate possible that allows the resin to solidify or re-crystallize on the strand input before it is spooled, and is readily obvious to the person skilled in the art. Rates on the order of 80–750 ft/min have been achieved.

The string binder formed according to the method of the present invention may be co-roved with a reinforcing fiber material to form a multi-end roving product having the desirable characteristics of the novel string binder. This reinforcing fiber material may be selected from glass, polymer, natural fibers, or any combination thereof. Examples of such reinforcing fiber materials include, but are not limited to glass, KEVLAR®, polyaramids, polyesters such as DACRON®, and natural fibers such as linen, jute, hemp, cotton and sisal. Preferably, the reinforcing fiber material is in the form of a continuous roving. To form the co-roved multi-end product, one or more ends of string binder is roved together with one or more ends of a reinforcing fiber material, such as glass, using any conventional winding process. For example, roving ends from 1–3 wound spools of continuously formed string binder of the present invention may be lined up in a creel simultaneously with roving ends from about 10–20 forming cakes of glass reinforcing fiber strand. Unlike the string binder of the present invention, the reinforcing fiber material used to make the co-roved product is not coated with the low-acid binder resin composition used to form the string binder. This reinforcing fiber material may, however, be sized with an acceptable sizing treatment before being co-roved with the string binder. Application of a sizing treatment typically provides certain desirable effects to the reinforcing fiber material, such as protection from damage by attrition or erosion, and enhances wetout of the fibers in the composite matrix, when molded. Preferably, the sizing treatment is applied to the strands of reinforcing fiber material before they are wound into forming cakes.

The combined ends of the string binder and reinforcing fiber material may then be co-roved or wound together onto a spool, thereby forming a multi-end roving having a proportionate amount of string binder within the roving. The proportion of string binder to the reinforcing fiber material may be varied according to the desired product specifications, the quantities of each being readily determined by one having ordinary skill in the art. Preferably, the proportion of string binder to reinforcing fiber material in the present invention ranges from about 10 to 15% by weight of string binder to about 85% to 90% by weight of fiber reinforcing material.

The multi-end roving formed according to the method of this invention may be incorporated into several reinforcing articles, depending on the desired application. For example, the multi-end rovings may be used to form a woven fabric reinforcement, such as a woven roving or a multi-axial stitched reinforcement. Alternatively, the multi-end rovings may also be used, in continuous or chopped form, in various applications requiring an input of reinforcing fiber segments.

In an embodiment requiring input of chopped reinforcing fiber segments, the solidified strand of string binder, or, preferably, the multi-end roving comprising the thermosettable resin-coated string binder, may immediately be chopped into segments instead of being spooled after forming. Preferably, the length of such segments is typically from about ½ inch up to about 3 inches in length. Most preferably, the chopped segments are from about 1 inch to about 3 inches in length, The segments obtained according to the aforementioned procedure are preferably used to make preforms using a spray-up process. Such a process is described in U.S. Pat. No. 3,170,197, which is herein incorporated by reference. In a particularly preferred embodiment including this method, segments of a multi-end roving comprising the string binder are blown or spread by conventional means over a shaped preform screen and a sufficient level of heat applied to soften the binder resin enough to permit some fusing of the segments. Preferably, suction is applied to promote compacting of the segments as they fuse. The process of fusing allows the layered material to conform to the shape of the preform screen, and the material is then set into a solid matted structure or preform that can be physically transported if necessary to another location to complete the molding process that forms the final composite product. Preferably, the preform of the present invention may be subjected to heat, radiation or other curing means to cure the preform before it is molded.

Where the reinforcing article is a preform, it may typically comprise from about 10% to about 15% by weight of string binder, in combination with from about 85% to about 90% by weight of another reinforcing material. The weight ratio of the amount of fibrous carrier substrate to the amount of binder resin material is preferably about 50:50 in the string binder. To make the preform, the chopped segments may be laid up on a consolidation screen, and optionally compressed using suction drawn through the screen to form the material into a desired shape that conforms to the contour of the screen. Preferably, the binder resin in the preform is fully cured before the preform is molded to form the composite product.

Figure 3:
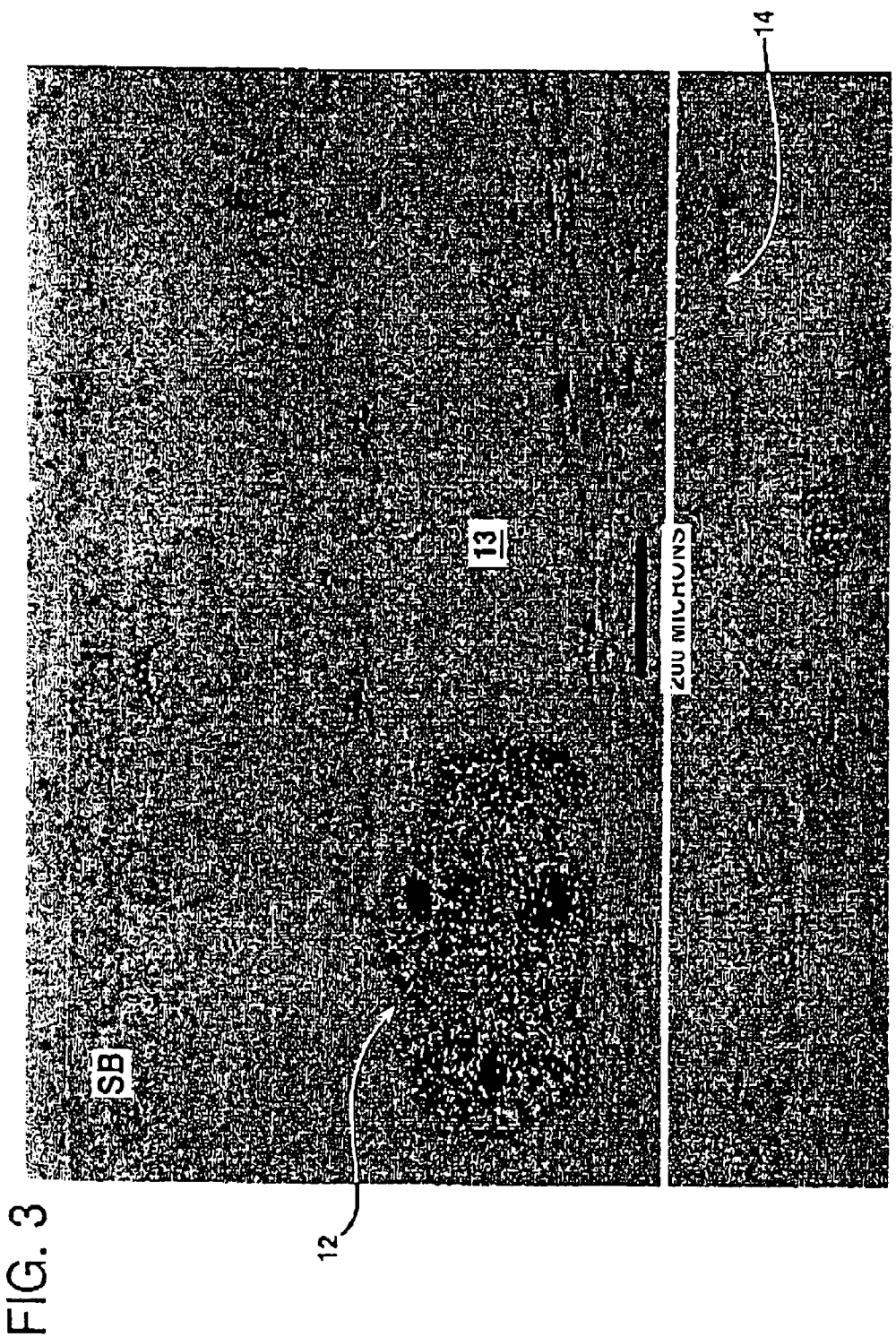
FIG. 3 is an illustration of a photomicrograph of a cross-section of a composite laminate incorporating a string binder according to a first embodiment of the present invention.
Figure 4:
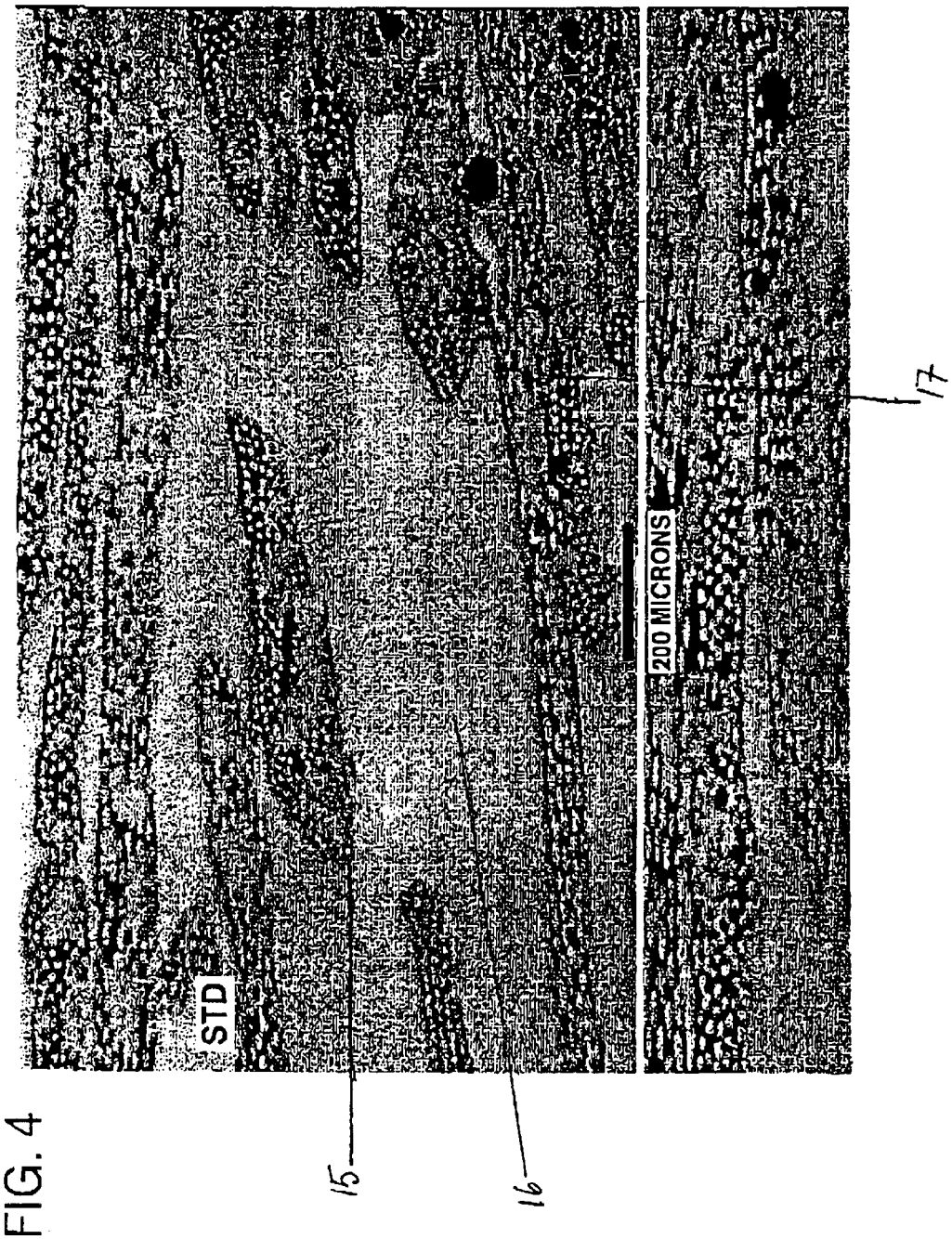
FIG. 4 is an illustration of a photomicrograph of a cross-section of a composite laminate incorporating a string binder according to the prior art.

The preform of this invention may be used in otherwise conventional molding processes, for example liquid resin molding. Typically, the preform is placed in a mold cavity into which a moldable matrix polymer material is injected or otherwise added. Any moldable matrix polymer materials that are compatible with the thermoset binder resin material of the string binder in the preform can be used. Typical moldable matrix polymer resins that can be used include vinyl esters, polyesters, urethanes and phenolic thermoplastics. Preferably, the moldable matrix resin is a urethane polymer that is compatible with the low-acid binder resin material that is present in the string binder. The skilled artisan will be able to identify other moldable matrix, resin materials suitable for use with preforms made according to this invention without undue experimentation. A transverse section of a molded composite article prepared using a preform according to the present invention is represented by FIG. 3, which depicts a composite laminate comprising the string binder 12, embedded in a moldable matrix polymer material 13, which also comprises fibrous reinforcement tows 14 as an additional reinforcing fiber material. As seen from this figure, the string binder of the present invention presents an improvement over the prior art in terms of the improved wet-out of the fibers in the composite laminate, with fewer voids or spaces being present between the fibers and the matrix polymer material. A conventional laminate made without the string binder of this invention is depicted in FIG. 4. Such a conventional laminate comprises a string binder 15 made from a standard gun-roving coated with a spray-emulsion binder, and embedded in a matrix polymer material 16, in which exists a multiplicity of voids 17.

Figure 5B:
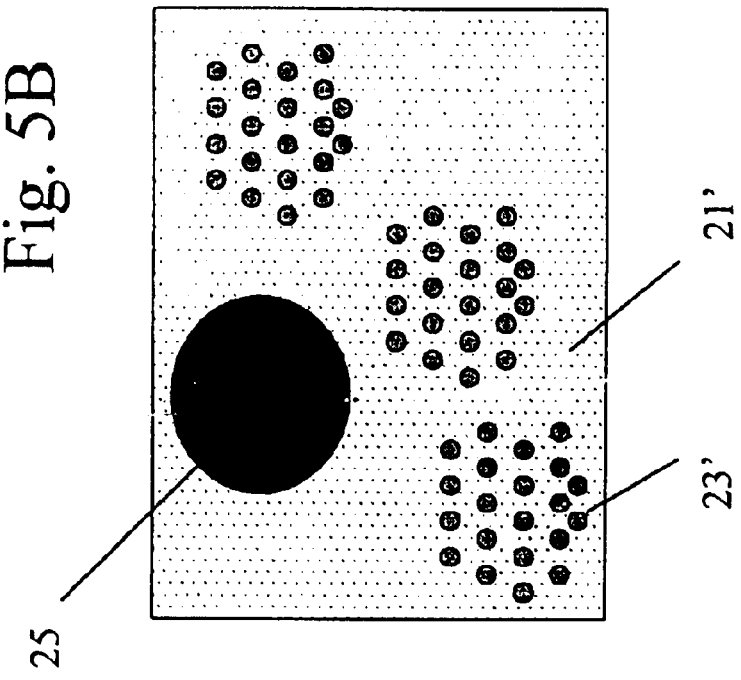
FIGS. 5A and 5B are schematic representations of a cross-section of a laminate incorporating a string binder according to the prior art, and an embodiment of the present invention, respectively.
Figure 5A:
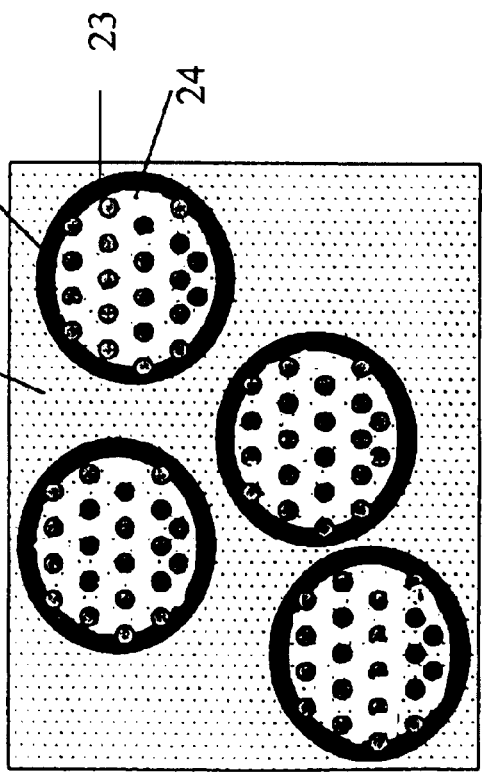

FIGS. 5A and 5B further illustrate the benefit of the present invention compared to the prior art. Specifically, the laminate includes glass fiber reinforcements 23 within a resin material 21. The reinforcements 23 are bundled with a binder coating 22 substantially thereabout. The bundle does not have a good wet-out, as described above, and therefore, includes a large amount of air voids 24 between the fibers 23, and which may ultimately produce blistering of the laminate.

In contrast, a laminate made according to the present invention includes glass fiber reinforcements 23' within a resin material 21'. A number of binder coated strands 25 are provided within the laminate. As illustrated in FIG. 5B, the bundles of glass fibers 23' have substantially fewer air voids.

The string binder of the present invention therefore comprises, in its various embodiments, a core strand of fibrous carrier substrate, which is coated on its surface with at least one layer of a binder resin composition, and it may also comprise at least one layer of a catalyst composition as a pre-coating or a post-coating. Where the catalyst composition is applied as a post-coating, optionally at least one layer of a composition comprising a film-forming polymer may be applied atop the at least one layer of post-coating. Alternatively, the catalyst may be commingled with the binder resin composition before it is applied, and thereby remain commingled with the binder resin material in the solidified coating. The resulting dried, coated fibrous carrier substrate alone may comprise the string binder, or it may be co-roved with one or more ends of another reinforcing fiber material to form a co-roved multi-end roving as the final string binder product. In addition to forming a continuous, roved product, the string binder or multi-end roving formed therefrom may also be chopped into segments and used in forming operations such as the manufacture of durable preforms.

Where the catalyst composition is applied as a separate layer in the form of either a pre-coating or post-coating, it has been found that the adhesion of both the catalyst composition and the binder resin composition to the surfaces of the fibrous carrier substrate is improved. In both respects, the presence of the carrier material in combination with the catalyst improves coating ability of the catalyst composition, and as a result flaking and peeling of the dried catalyst composition and binder resin composition from the surfaces of the fibrous carrier substrate is reduced by as much as about 93%.

Moreover, the use of a solvent-free liquid binder resin material in the binder resin composition according to the present invention provides certain advantages, in comparison to conventional approach of applying a solution or melt of a binder resin to strand segments during preform manufacture. For example, where the string binder is desirably used to make a reinforcing article such as a preform, use of the string binder as a reinforcement is greatly simplified because the need to apply a liquid binder resin onto the preform screen is eliminated. As a result, the problems of poor binder resin application efficiency and excess build-up of resin on equipment, which has been a concern of preform makers using more conventional approaches, is altogether eliminated. Additionally, because no solvents are used to dissolve or emulsify the binder resin, emissions of volatile organic chemicals from the solvent during the forming operation are substantially eliminated. Use of the preferred string binder products of the invention also results in products having superior physical characteristics and appearance.

The use of the string binders of the present invention to make reinforcing articles also demonstrates certain manufacturing improvements over the prior art. By using the string binders herein described, preforms may be manufactured without the need for metering, measuring or otherwise controlling the addition of a separate molten or solubilized binder during the preform manufacturing process. The string binder may also be used without requiring the re-tooling of existing manufacturing equipment.

The following examples are representative of the invention.

EXAMPLES

Example 1

Preparation of Low-Acid Crystalline Resin

A 50-gallon stainless steel reactor configured with a steam-heated packed column and a water-cooled condenser was loaded with 95.57282 kg of fumaric acid, 74.20541 kg of 1,4-butandeiol and 10.222177 kg of ethylene glycol. To this mixture was added 16.74 g of hydroquinone as a polymerization inhibitor. The reactor was heated to about 200° C. and sparged with nitrogen gas, thereby facilitating a poly-condensation reaction to form the low-acid crystalline resin, and producing water of condensation as a by-product. Throughout the reaction, the acid value of the crystalline resin was measured using a standard titration against an aqueous potassium hydroxide (KOH) solution, to derive the degree of acidity expressed as the milligrams of KOH needed for neutralization per gram of the resin that was formed.

When the acid value had been reduced to a value from 0 to about 30 mg KOH/g resin, the reaction mass was cooled to a temperature of from about 120° C. to about 150° C. at which time 82.44 g of t-butylcatechol and 2.70 g p-benzoquinone was added to the molten mass. (At this point, other compounds may optionally be added, such as from about 1% to about 5% weight of oligo(propylene glycol-alt-maleic anhydride); about 0.25% weight dipropylene glycol and about 1% weight styrene). The resulting low-acid crystalline resin was then transferred to a fiber drum or release paper over a 15–30 minute period, and allowed to cool to room temperature. The solidified crystalline resin was then broken into small pieces and ground into a powder. The final acid value of the crystalline material ranged from about 0 to about 15 mg KOH/g resin. The final viscosity ranged from about 1 poise to about 25 poise, as measured by, cone and plate, with about 12 poise being preferred.

Examples 2–6

Preparation of String Binders

Example 2

A continuous, single-end strand of G-75 glass yarn (7500 yd/lb.) was pre-coated with a catalyst composition comprising a solution of 1.5 parts catalyst in 98.5 parts acetone. The catalyst composition was applied using a graphite roll applicator, after which the pre-coated strand was dried in an oven at a temperature below 177° C. (350° F.). The dry, pre-coated strand was then passed through a heated bath of binder resin composition comprised of a low-acid crystalline polyester maintained at a temperature of about 133° C. The low-acid crystalline polyester was prepared according to the scheme described in Example 1 above. The strand impregnated with the binder resin composition was then pulled through a stripper die with an orifice diameter of about 0.012 in. to remove the excess resin. The resin was then solidified on the strand as it was pulled through an unheated, forced-air cooling chamber at a rate of about 80 ft./min. At a location about 10 feet from the exit of the die, and before the entrance of the cooling chamber, the strand was exposed to a fine mist water spray to facilitate cooling.

A sample of the cooled strand of string binder was then cut into small pieces of about 3" in length, and put into an oven at 390° F. for 4 min. This step served as a quality check to ensure that the low acid crystalline polyester would properly melt and cure during matrix resin impregnation and cure of the composite. At the end of the 4-min. period, the sample was removed from the oven. At that point, the sample was hard and stiff, and a definite color change from white to a dear yellow was observed, indicating a good cure. The LOI (loss on ignition) of the sample was determined to be about 50.3%. This value indicated that approximately 50.3% of the strand weight was organic, non-glass material.

Once the string binder was determined to have an acceptable LOI and to demonstrate good curing ability, it was then chopped into segments and fabricated into preforms. When the string binder of the present invention was fabricated into preforms and molded with a matrix resin system to form composites, several improvements in the resulting composites were observed in comparison to composites made using preforms with the fiber-binder systems of the prior art. The invention provided composites in which the fiber strand segments were less visible, which was an indication of better wet-out in the composite matrix resin. Further, there was a visible reduction in the degree of blistering that occurred when the composite was finally molded and cured. There was also a reduction in the degree of bleeding after a post-bake process.

Example 3

A continuous, single-end strand of G-75 glass yarn (7500 yd/lb.) was pre-coated with an water based emulsified catalyst composition comprising 3 parts catalyst and 3 parts PU-403 polyurethane film former (Bayer) or Aquathane 522 (Reichhold), dry solids basis, in 91 parts water. The catalyst composition was applied using a dip bath and stripper die (0.012 in.), after which the pre-coated strand was dried in an oven at a temperature of approximately 107° C. (225° F.). The dry, pre-coated strand was then passed through a heated bath of binder resin composition comprised of a low-acid crystalline polyester maintained at a temperature of about 133° C. The low-acid crystalline polyester was prepared according to the scheme described in Example 1 above. The strand impregnated with the binder resin composition was then pulled through a stripper die with an orifice diameter of about 0.0145 in. to remove the excess resin. The resin was then solidified on the strand by first passing it through a water mist spray to facilitate cooling. It then traversed an open area interspersed with 2 forced air-drying units (air knives) before being wound onto a package. Overall line speed was 150 feet per minute (fpm).

A sample of the cooled string binder strand was then cut into small pieces of about 3" in length, and put into an oven at 390° F. for 4 min. This step served as a quality check to ensure that the binder resin would property melt and cure during matrix resin impregnation and cure of the composite. At the end of the 4-min. period, the sample was removed from the oven. At that point, the sample was hard and stiff, and a definite color change from white to a dear yellow was observed, indicating a good cure. The LOI (loss on ignition) of the sample, which is a measure of the proportion of organic, non-glass material, based on strand weight, was determined to be about 45%. This value indicated that approximately 45% of the strand weight was organic, non-glass material.

Example 4

A continuous, single-end strand of G-75 glass yarn (7500 yd/lb.) was pre-coated with a water based catalyst composition comprising a solution of 3 parts catalyst, dry solids basis, in 97 parts water. The catalyst composition was applied using a dip bath and stripper die (0.012 in.), after which the pre-coated strand was dried in an oven at a temperature of 107° C. (225° F.). The dry, pre-coated strand was then passed through a heated bath of binder resin composition comprised of a low-acid crystalline polyester maintained at a temperature of about 133° C. The low-acid crystalline polyester was prepared according to the scheme described in Example 1 above. The strand impregnated with the binder resin composition was then pulled through a stripper die with an orifice diameter of about 0.0145 in. to remove the excess resin. A post-coating was then applied to the strand by passing it through a bath consisting of 6%, on a dry solids basis, of polyurethane emulsion (PU-403, commercially available from Bayer, or Aquathane 522, commercially available from Reichgold), in demineralized water. The post-coated strand was then passed back through the oven at 107° C. (225° F.) to form the solidified string binder product, then wound into a forming package. Overall line speed throughout the process was 150 fpm.

A sample of the cooled string binder strand was then cut into small pieces of about 3" in length, and put into an oven at 390° F. for 4 min. This step served as a quality check to ensure that the binder resin would properly melt and cure during matrix resin impregnation and cure of the composite. At the end of the 4-min. period, the sample was removed from the oven. At that point, the sample was hard and stiff, and a definite color change from white to a clear yellow was observed, indicating a good cure. The LOI (loss on ignition)

of the sample, which is a measure of the proportion of organic, non-glass material, based on strand weight, was determined to be about 45%. This value indicated that approximately 45% of the strand weight was organic, non-glass material.

Example 5

A continuous, single-end strand of G-75 glass yarn (7500 yd/lb.) was passed through a heated bath of binder resin composition comprised of a low-acid crystalline polyester maintained at a temperature of about 133° C. The low-acid crystalline polyester was prepared according to the scheme described in Example 1 above. The strand impregnated with the binder resin composition was then pulled through a stripper die with an orifice diameter of about 0.0145 in. to remove the excess resin. A post-coating was then applied to the strand by passing it through a bath containing a water-based emulsified catalyst composition comprising 3 parts catalyst, and 3 parts to polyurethane film former (PU-403, or Aquathane 522), in 91 parts water. The catalyst composition was applied using a dip bath and stripper die (0.012 in.), after which the post-coated strand was dried in an oven at a temperature at 107° C. (225° F.), and wound into a forming package. The overall line speed was 150 fpm.

A sample of the cooled string binder strand was then cut into small pieces of about 3" in length, and put into an oven at 390° F. for 4 min. This step served as a quality check to ensure that the binder resin would properly melt and cure during matrix resin impregnation and cure of the composite. At the end of the 4-min. period, the sample was removed from the oven. At that point, the sample was hard and stiff, and a definite color change from white to a clear yellow was observed, indicating a good cure. The LOI (loss on ignition) of the sample, which is a measure of the proportion of organic, non-glass material, based on strand weight, was determined to be about 45%. This value indicated that approximately 45% of the strand weight was organic, non-glass material.

Example 6

A continuous, single-end strand of G-75 glass yarn (7500 yd/lb.) was pre-coated with an water based emulsified catalyst composition comprising 3 parts catalyst, dry solids basis, and 3 parts polyurethane film former (PU-403, or Aquathane 522), in 91 parts water. The catalyst composition was applied using a dip bath and stripper die (0.012 in.), after which the pre-coated strand was dried in an oven at a temperature at 107° C. (225° F.). The dry, pre-coated strand was then passed through a heated bath of binder resin composition comprised of a low-acid crystalline polyester maintained at a temperature of about 133° C. The low-acid crystalline polyester was prepared according to the scheme described in Example 1 above. The strand impregnated with the binder resin composition was then pulled through a stripper die with an orifice diameter of about 0.0145-in. to remove the excess resin. The strand was then treated with a post coat by passing it through a bath consisting of 6% PU-403 polyurethane emulsion or Aquathane 522 (dry solids basis) in demineralized water. It then was passed back through the oven at 107 C. (225 F.) before being wound onto a package. Overall line speed was 150 fpm.

A sample of the cooled string binder strand was then cut into small pieces of about 3" in length, and put into an oven at 390° F. for 4 min. This step served as a quality check to ensure that the binder resin would properly melt and cure during matrix resin impregnation and cure of the composite. At the end of the 4-min. period, the sample was removed from the oven. At that point, the sample was hard and stiff, and a definite color change from white to a clear yellow was observed, indicating a good cure. The LOI (loss on ignition) of the sample, which is a measure of the proportion of organic, non-glass material, based on strand weight, was determined to be about 4%. This value indicated that approximately 45% of the strand weight was organic, non-glass material.

It is believed that Applicants' invention includes many other embodiments which are not herein described, accordingly this disclosure should not be read as being limited to the foregoing examples or preferred embodiments.

What is claimed is:

1. A string binder comprising:
   at least one strand of a fibrous carrier substrate;
   at least one layer of a solvent-free binder resin composition coated on each of said at least one strand of said fibrous carrier substrate, said solvent-free resin composition comprising a thermoformable liquid binder resin material having an acid value of less than about 30 mg KOH/g of resin; and
   at least one layer of a post-coating of a catalyst composition coated on said solvent-free binder resin composition, said catalyst composition comprising an effective amount of a catalyst having a high activation temperature.

2. A multi-end roving comprising:
   a) one or more strands of a reinforcing fiber material; and
   b) one or more strands of a string binder, said string binder comprising:
   at least one strand of a fibrous carrier substrate;
   at least one layer of a solvent-free binder resin composition coated on each of said at least one strand of said fibrous carrier substrate, said solvent-free resin composition comprising a thermoformable liquid binder resin material having an acid value of less than about 30 mg KOH/g resin; and
   at least one layer of a post-coating of a catalyst composition coated on said layer of said solvent-free binder resin composition, said catalyst composition comprising an effective amount of a catalyst having a high activation temperature.

3. The multi-end roving of claim 2, in the form of chopped segments.

4. The multi-end roving of claim 3, wherein the chopped segments are from about ½" to about 3" in length.

* * * * *